Aug. 11, 1925. 1,548,930

A. H. CANDEE

HOB AND METHOD OF PRODUCING THE SAME

Filed March 27, 1922

INVENTOR.
ALLAN H. CANDEE
BY
ATTORNEY.

Patented Aug. 11, 1925.

1,548,930

UNITED STATES PATENT OFFICE.

ALLAN H. CANDEE, OF MILWAUKEE, WISCONSIN, ASSIGNOR TO THE FALK CORPORATION, OF MILWAUKEE, WISCONSIN, A CORPORATION OF WISCONSIN.

HOB AND METHOD OF PRODUCING THE SAME.

Application filed March 27, 1922. Serial No. 547,031.

*To all whom it may concern:*

Be it known that I, ALLAN H. CANDEE, a citizen of the United States, residing at Milwaukee, in the county of Milwaukee and State of Wisconsin, have invented a certain new and useful Improvement in Hobs and Methods of Producing the Same, of which the following is a full, clear, concise, and exact description, reference being had to the accompanying drawings, forming a part of this specification.

This invention relates to hobs for use, primarily, in cutting the teeth of gears of the spur, helical or worm types, although the novel features thereof may be employed to advantage in hobs for cutting other shapes.

Hobs for these purposes ordinarily comprise a number of cutting teeth projecting from a cylindrical base and arranged in one or more helical series extending thereabout. The teeth are usually formed as integral parts of the cylinder, although in some instances they are removably secured thereto. Integral hobs are ordinarily produced by providing a cylinder having one or more integral threads on the surface thereof and by interrupting the thread or threads at regular intervals by transverse gashes or flues to form one or more helical series of separate projections constituting the bodies of the respective teeth. The face at the leading end of each projection thus formed contains the cutting edges of each tooth and will hereinafter be referred to as the cutting face.

In order to secure proper cutting clearance, the side faces, as well as the top face, of each tooth must be tapered off rearwardly from the cutting face. This is ordinarily accomplished in a relieving lathe in which the hob blank is rotated about its axis and the relieving tool or grinder advanced parallel to such axis to follow the lead of the original thread, the actual relief being effected by intermittently shifting the tool or grinder toward and from such axis in addition to its uniform advance parallel thereto.

The finished job is sharpened and resharpened from time to time by grinding the cutting faces of the respective teeth. Since the original cutting faces are thus destroyed and the fresh cutting edges occur at new positions along the relieved sides of the respective teeth, it is obvious that the shape of the relieved sides determines the characteristics of the fresh cutting edges.

The term "thread" will be employed herein to designate that imaginary helical thread defined by the cutting faces of successive teeth and whose sides constitute imaginary helicoidal surfaces containing the side cutting edges of the successive teeth. The term "lead" with reference to any thread or helix will be employed to designate the length along the hob axis of such thread or helix for one revolution.

Hobs are either single or multiple threaded, the number and lead of the threads of any particular hob being dependent upon the character of the work which the hob is designed to perform. Hob threads are commonly known to be straight or curved sided, dependent upon whether the intersection of an axial plane of the hob with the side of the thread is a straight or curved line.

It has been found that hobs produced by the old methods above outlined, particularly those of the curved sided type, will not cut exactly the same shapes after as before resharpening.

One object of the present invention is the provision of a curved sided hob which will cut the same shapes after as before resharpening.

Another object is the provision of a novel method of relieving hobs.

Other objects and advantages will hereinafter appear.

One embodiment of this invention is diagrammatically illustrated in the accompanying drawings, in which.

Figure 1:
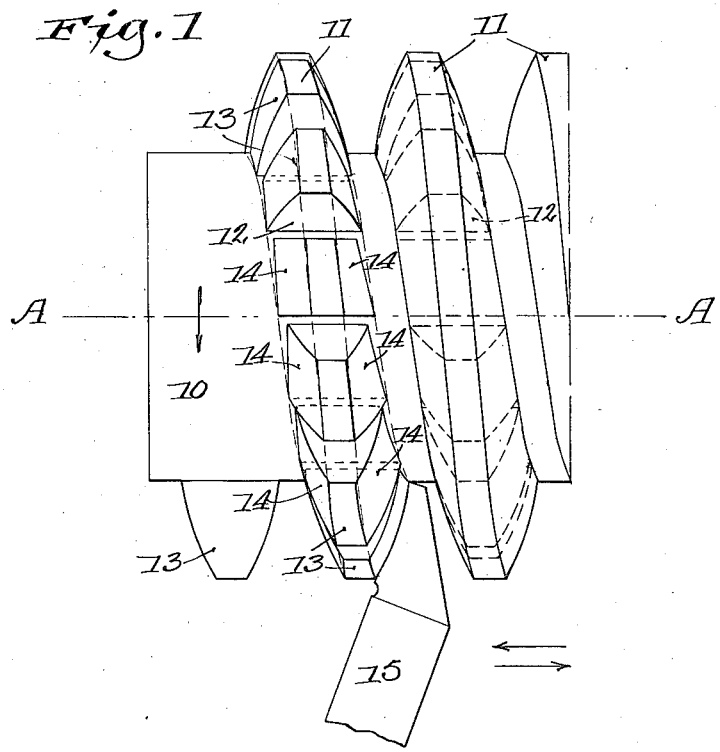
Figure 1 is a view in side elevation diagrammatically illustrating a partially completed hob produced in accordance with the teachings of the present invention.

The hob selected for illustration comprises a cylindrical base or body portion 10 having a single helical thread 11, shown part in full and part in dotted lines, projecting from the surface thereof. This thread is divided by transverse gashes or flutes 12 into a spiral series of separate projections 13 constituting the bodies of the respective hob teeth. In this instance, the gashes 12 extend parallel to the hob axis, although the invention is equally applicable to helically gashed or fluted hobs. The hob shown is designed for cutting theoretically correct involute gears and for this reason the thread 11 is curved sided rather than straight.

The sides 14 of the teeth are relieved in a novel manner. Since this method of relieving may be accomplished, however, by the use of most standard types of relieving lathes or grinders, a detailed description of such machines is deemed unnecessary. It will suffice here to say that these machines ordinarily include a main tool carriage, which may be advanced parallel to the axis of the hob blank at the desired uniform rate of speed, and which is provided with the usual auxiliary reciprocable carriage adjustably swiveled thereon and actuated by a snail cam. This cam is driven at such speed as to effect one revolution for each of the successive hob teeth. The relieving tool or grinding element, herein typified by the tool 15 of standard form, is secured to the auxiliary carriage. As hereinbefore pointed out, it has been the practice heretofore to so set the auxiliary carriage as to produce a reciprocation thereof and consequently of the tool, in a direction toward and from the axis of the hob and at right angles to it, under the action of the snail cam. I have discovered, however, that particularly in the case of curved sided hobs, improved results are obtained by reciprocating the tool in a direction substantially parallel to the hob axis, as indicated by the arrows in Figures 1 and 2. When a standard relieving lathe or grinder is employed, this may be accomplished by so setting the auxiliary table that the snail cam will effect reciprocation of the table parallel to rather than toward and from such axis. Thus, during the relieving operation, the tool is maintained at a uniform distance from such axis.

Figure 2:
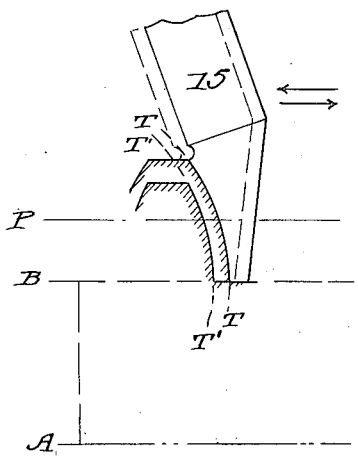
Figures 2 and 3 are diagrams illustrating by comparison the distinctive features of the present invention.
Figure 3:
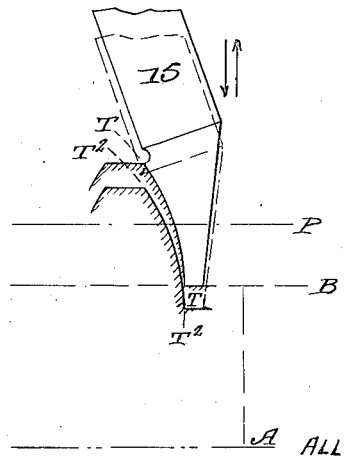

A comparison of Figures 2 and 3 will illustrate the difference in the results obtained by the old and new methods, respectively. In each figure, the line A—A indicates the axis of the hob blank, the line B—B the root circle, and the line P—P the pitch circle of the finished hob. Each of the lines T—T represent the intersection of an axial plane of the hob with the side of a tooth near the leading end thereof. The line $T_1$—$T_1$ represents the intersection of an axial plane of the hob with the side of a tooth relieved in accordance with the teachings of the present invention, and passing through the tooth at a point near the rear end thereof. The line $T_2$—$T_2$ represents the intersection of a corresponding axial plane of the hob with the side of a tooth relieved in accordance with the old methods. Thus, in Figure 2 relief is accomplished by reciprocating the tool 15 axially of the hob blank, while in Figure 3 the tool is reciprocated radially.

From an inspection of Figure 3, it will be noted that the points of intersection of the line P—P of the pitch circle with the curves T—T and $T_2$—$T_2$, respectively, are spaced apart a greater distance than the points of intersection of the line B—B of the root circle with these respective curves. Thus the axial displacement of the upper or outer portions of these curves is greater than the axial displacement of the lower or inner portions thereof, so that the surface of the relieved side of the tooth, generated by these curves, is not of the same lead at all diameters of the hob. By shifting the tool 15 axially, as indicated in Figure 2, however, the relative axial displacement of the curves T—T and $T_1$—$T_1$ is uniform throughout their lengths and the relieved face of the tooth therefor defines a helicoidal surface of uniform lead at all diameters.

In hobs designed for cutting involute gear teeth, there is a definite relation between the character of the curve T—T and its distance from the axis of the hob. Therefore, having computed or otherwise determined this curve with reference to its distance from the axis, this essential relationship is destroyed when the curve is displaced radially of the hob. It is apparent that in a hob produced by the old method, as indicated in Figure 3, resharpening of the hob teeth will result in a radial displacement of this curve, whereas no radial displacement occurs by the resharpening of the teeth of a hob produced by the novel method of Figure 2.

When generating gear teeth by the hobbing process, the gear is continuously rotated during the rotation of the hob so that the gear teeth continuously advance toward one side of the hob teeth and away from the other side. I have found that improved results are obtained if the cutting edge on that side of each hob tooth toward which the gear teeth advance is somewhat more acute than the edge on the other side. This I accomplish by effecting greater relief on that side of the tooth than on the other. When, as in the novel method above described, the relief on the two sides of the teeth is produced by separate operations, the desired difference in relief is readily effected merely by the use of different cams in the relieving lathe for the separate operations.

Various changes may be made in any of the embodiments of the invention above specifically described, without departing from or sacrificing any of the advantages of the invention, as defined in the appended claims. Throughout the claims the term "relieving element" is used in a generic sense to designate the means employed for forming the relieved sides of the hob teeth, whether it be in the form of a lathe tool or grinding element.

I claim:

1. The improved method of relieving hob teeth which consists in producing an intermittent relative reciprocating movement between the hob blank and the relieving element in a direction substantially axially of the hob blank during the rotation thereof.

2. The improved method of relieving hob teeth which consists in rotating the hob blank, advancing the relieving element axially of the hob blank to follow the thread thereof, and reciprocating the relieving tool or grinder in a direction substantially axially of the hob blank during the advance thereof.

3. The improved method of relieving hob teeth which consists in producing an intermittent relative reciprocating movement between the hob blank and relieving element and maintaining such tool or grinder at a substantially uniform distance from the axis of the blank.

4. A hob having one or more helical series of teeth whose relieved side faces comprise helicoidal surfaces of uniform lead at all diameters of the hob, the amount of relief on one side of each tooth being greater than on the other.

5. A hob having one or more helical series of relieved teeth, the amount of relief on that side of each tooth toward which a gear rotates during the hobbing process being somewhat greater than that on the other side.

In witness whereof, I hereunto subscribe my name this 14th day of March, 1922.

ALLAN H. CANDEE.